US010248427B2

(12) United States Patent
Lee

(10) Patent No.: US 10,248,427 B2
(45) Date of Patent: Apr. 2, 2019

(54) SEMICONDUCTOR DEVICE PERFORMING BOOT-UP OPERATION ON NONVOLATILE MEMORY CIRCUIT AND METHOD OF OPERATING THE SAME

(71) Applicant: SK hynix Inc., Gyeonggi-do (KR)

(72) Inventor: Kang-Seol Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 329 days.

(21) Appl. No.: 14/567,595

(22) Filed: Dec. 11, 2014

(65) Prior Publication Data
US 2016/0026471 A1    Jan. 28, 2016

(30) Foreign Application Priority Data
Jul. 22, 2014    (KR) .................. 10-2014-0092614

(51) Int. Cl.
*G06F 9/44* (2018.01)
*G06F 12/02* (2006.01)
*G06F 9/4401* (2018.01)
*G06F 12/06* (2006.01)

(52) U.S. Cl.
CPC .......... *G06F 9/4401* (2013.01); *G06F 9/4406* (2013.01); *G06F 12/0246* (2013.01); *G06F 12/0638* (2013.01); *G06F 2212/7201* (2013.01)

(58) Field of Classification Search
CPC .......... G11C 7/10; G11C 17/16; G11C 29/00; G11C 17/18; G11C 16/06; G11C 7/00; G11C 29/04; G11C 5/14; G06F 21/00; G06F 15/177; G06F 12/14; G06F 13/00; G06F 9/00; G06F 9/24; G06F 1/26; G06F 12/02; G06F 13/14; G06F 13/16; G06F 9/445

USPC ..... 711/103, 100, 154; 365/200, 96, 189.12, 365/185.09, 226, 189.09, 185.33
See application file for complete search history.

(56) References Cited

U.S. PATENT DOCUMENTS

| 5,987,562 | A * | 11/1999 | Glover ................... | G11B 19/04 375/345 |
| 2003/0229814 | A1* | 12/2003 | Garnett ................ | G06F 9/4411 713/322 |
| 2007/0147144 | A1* | 6/2007 | Tokiwa .................. | G11C 29/76 365/200 |
| 2008/0082812 | A1* | 4/2008 | Kirshenbaunn ....... | G06F 9/4401 713/2 |
| 2009/0273378 | A1* | 11/2009 | Mangnall .................. | G06F 1/04 327/156 |

(Continued)

FOREIGN PATENT DOCUMENTS

KR    1020140026223    3/2014

*Primary Examiner* — Tuan V Thai
*Assistant Examiner* — Edward Waddy, Jr.
(74) *Attorney, Agent, or Firm* — IP & T Group LLP

(57) ABSTRACT

A semiconductor device includes one or more internal circuits; a nonvolatile memory circuit including a first region suitable for storing first data for the nonvolatile memory circuit and a second region suitable for storing second data for the internal circuits; a first register suitable for temporarily storing the first data; one or more second registers suitable for temporarily storing the second data; and a control circuit suitable for controlling the nonvolatile memory circuit to transmit the first data and the second data to the first register and to the second registers, respectively, when a boot-up operation is performed.

15 Claims, 12 Drawing Sheets

(56) References Cited

U.S. PATENT DOCUMENTS

2010/0091537 A1\* 4/2010 Best .................. G11C 5/02
 365/51

\* cited by examiner

SEMICONDUCTOR DEVICE PERFORMING BOOT-UP OPERATION ON NONVOLATILE MEMORY CIRCUIT AND METHOD OF OPERATING THE SAME

CROSS-REFERENCE TO RELATED APPLICATIONS

The present application claims priority of Korean Patent Application No. 10-2014-0092614, filed on Jul. 22, 2014, which is incorporated herein by reference in its entirety.

BACKGROUND

1. Field

Various embodiments of the present invention relate to a semiconductor device that performs a boot-up operation.

2. Description of the Related Art

A variety of semiconductor devices, such as a central processing unit (CPU), a graphics processing unit (GPU), an application processor (AP), and a memory device, use a fuse to store information required for operation thereof. The information may include setting information and repair information. Programming a laser fuse is accomplished by cutting the laser fuse with a laser. This means that the fuse may be programmed only in the wafer state and is incapable of being programmed after the wafer is packaged. An e-fuse (i.e., an electrical fuse) may be used to overcome the limitations of the laser fuse. An e-fuse uses a transistor that stores data by changing the resistance between the gate and the drain/source.

FIG. 1 is a diagram illustrating an e-fuse implemented with a transistor that operates as a resistor or capacitor.

Referring to FIG. 1, the e-fuse includes a transistor T having a gate G receiving a power supply voltage and a drain/source D/S receiving a ground voltage.

When a normal power supply voltage, which is tolerable to the transistor T, is applied to the gate G, the e-fuse operates as a capacitor C. Thus, there is no current flowing between the gate G and the drain/source D/S. However, when a high power supply voltage, which is intolerable to the transistor T, is applied to the gate G, the gate oxide of the transistor T is destroyed. Accordingly, the gate G and the drain/source D/S may be shorted such that the e-fuse operates as a resistor R. In this case, current flows between the gate G and the drain/source D/S.

The data of the e-fuse is recognized through the resistance between the gate G and the drain/source D/S of the e-fuse. To recognize the data of the e-fuse, two methods are used. First, the data of the e-fuse may be recognized directly without performing an additional sensing operation by increasing the size of the transistor T. Second, the data of the e-fuse may be recognized by sensing current flowing through the transistor T using an amplifier. However, these two methods have restrictions on circuit area because the transistor T is designed to be large in size or the additional amplifier needs to be provided for each e-fuse.

U.S. Pat. No. 7,269,047 has disclosed a method for reducing the circuit area occupied by e-fuses by forming the e-fuses in an array.

FIG. 2 is a diagram illustrating a conventional cell array 200 implemented with e-fuses.

Referring to FIG. 2, the cell array 200 includes memory cells 201 to 216 arranged in N rows and M columns. The memory cells 201 to 216 include memory elements M1 to M16 and switch elements S1 to S16, respectively. For example, a memory cell 201 includes a to memory element M1 and a switching element S1. The memory elements M1 to M16 are e-fuses having the properties of resistors or capacitors, depending on whether the e-fuses are ruptured. That is, the e-fuses M1 to M16 may be considered as resistive memory elements to store data according to the amount of resistance. The switch elements S1 to S16 electrically couple the memory elements M1 to M16 to the column lines BL1 to BLM, respectively, under the control of row lines WLR1 to WLRN.

Hereafter, suppose that the second row and the M-th column are selected, that is, the memory cell 208 is a selected memory cell. Voltages applied to the selected memory cell 208 and the unselected memory cells 201 to 207 and 209 to 216 during program and read operations will be described.

Program Operation

The row line WLR2 of the selected row is activated, and the other row lines WLR1 and WLR3 to WLRN are deactivated. Thus, the switch elements S5 to S8 are turned on, and the switch elements S1 to S4 and S9 to S16 are turned off. At this time, a high program voltage that may break the gate oxide of a transistor (i.e., a memory element) is applied to a program/read line WLP2 of the selected row, and a low-level voltage, for example, ground voltage, is applied to the other program/read lines WLP1 and LWP3 to WLPN. In general, the program voltage is a high voltage generated by a charge pumping method using a power supply voltage. The selected column line BLM to is coupled to a data access circuit (not shown), and the unselected column lines BL1 to BLM-1 float. The data access circuit drives the selected column line BLM to a logic low level to program (or rupture) the memory element M8 of the selected memory cell 208 when input data is program data, for example, '1'. Meanwhile, the data access circuit drives the selected column line BLM to a logic high level to prevent the memory element M8 of the selected memory cell 208 from being programmed when the input data is not program data, for example, '0'. Since the unselected column lines BL1 to BLM-1 float, the memory elements M5 to M7 are not programmed even though a high voltage is applied to the gates thereof.

Read Operation

The row line WLR2 of the selected row is activated, and the other row lines WLR1 and WLR3 to WLRN are deactivated. Thus, the switch elements S5 to S8 are turned on, and the switch elements S1 to S4 and S9 to S16 are turned off. At this time, a read voltage, for example, a power supply voltage, suitable for a read operation is applied to the program/read line WLP2 of the selected row, and a low-level voltage, for example, ground voltage, is applied to the other program/read lines WLP1 and LWP3 to WLPN. The selected column line BLM is coupled to the data access circuit, and the unselected column lines BL1 to BLM-1 are floated. When current flows through the selected column line BLM, the data access circuit recognizes that the memory element M8 is programmed, that is, the data access circuit recognizes the data of the memory cell 208 as '1'. On the other hand, when no current flows through the selected column line BLM, the data access circuit recognizes that the memory element M8 is not programmed, that is, the data access circuit recognizes the data of the memory cell 208 as '0'.

FIG. 2 illustrates that one column line BLN is selected among the column lines BL1 to BLN. However, several column lines may be selected at once. That is, several memory cells belonging to one row may be simultaneously programmed or read.

FIG. 3 is a block diagram illustrating an e-fuse array circuit 300 including the cell array 200 shown in FIG. 2.

Referring to FIG. 3, the e-fuse array circuit 300 includes the cell array 200 shown in FIG. 2, a row circuit 310, a column decoder 320, and a data access circuit 330.

The row circuit 310 controls the row lines WLR0 to WLR and the program/read lines and allows the above-described program and read operations to be performed. A row address ROW_ADD inputted to the row circuit 310 designates a row selected among a plurality of rows, a program signal PGM directs a program operation, and a read signal RD directs a read operation.

The column decoder 320 electrically couples a column line, selected by the address COL_ADD among the column lines BL1 to BLM, to the data access circuit 330. FIG. 3 exemplarily illustrates that eight column lines are simultaneously selected among the column lines BL1 to BLM.

The data access circuit 330 performs data access operations on the column lines selected by the column decoder 320. During a program operation, the data access circuit 330 controls the selected column lines to be programmed or non-programmed according to input data DATA<0> to DATA<7>. During a read operation, the data access circuit 330 senses whether current flows through the selected column lines and outputs the sensed results as output data DATA<0> to DATA<7>.

FIG. 4 is a diagram illustrating a conventional memory device in which the e-fuse array circuit 300 is included.

Referring to FIG. 4, the memory device includes a plurality of memory banks BK0 to BK3, a plurality of registers 410_0 to 410_3, a resistor 410_4, a setting circuit 420, and the e-fuse array circuit 300. The plurality of registers 410_0 to 410_3 are provided for the respective memory banks BK0 to BK3 to store repair information, and the register 410_4 stores setting information.

The e-fuse array circuit 300 stores repair information used in the memory banks BK0 to BK3, for example, addresses of defective memory cells included in the memory banks BK0 to BK3. Furthermore, the e-fuse array circuit 300 stores setting information required for the operation of the memory device.

The registers 410_0 to 410_3 provided for the respective memory banks BK0 to BK3 store the repair information of the corresponding memory banks. For example, the register 410_0 stores the repair information of the memory bank BK0, and the register 410_2 stores the repair information of the memory bank BK2. Furthermore, the register 410_4 stores setting information to be used in the setting circuit 420.

The setting circuit 420 may set various setting values required for operation of the memory device, using the setting information stored in the register 410_4. For example, the setting circuit 420 may set an internal voltage level and various latencies. The information stored in the registers 410_0 to 410_4 is maintained only while power is supplied. The repair information and the setting information to be stored in the registers 410_0 to 410_4 are received from the e-fuse array circuit 300. The e-fuse array circuit 300 transmits the stored repair information and setting information to the registers 410_0 to 410_4 when a boot-up signal BOOTUP is activated.

Since the e-fuse array circuit 300 is configured in an array, a predetermined processing time is required to call data stored in the e-fuse array circuit 300. Since the data may not be called immediately, a repair operation or setting operation by directly using the data stored in the e-fuse array circuit 300 may not be performed. Thus, the repair information and the setting information stored in the e-fuse array circuit 30 are transmitted and stored into the registers 410_0 to 410_4, and the data stored in the registers 410_0 to 410_4 are used for the repair operation of the memory banks BK0 to BK3 and the setting operation of the setting circuit 420. The process of transmitting the repair information and the setting information stored in the e-fuse array circuit 300 to the registers 410_0 to 410_4 is referred to as a boot-up operation. Only after the boot-up operation is completed may the memory device repair a defective memory cell and perform various setting operations. Then, the memory device may start a normal operation.

Since the internal components of the memory device, that is, the memory banks BK0 to BK3 and the setting circuit 420, are operated by receiving the information required for operation from the e-fuse array circuit 300, the internal components may operate with optimal setting values. However, since it is impossible for the e-fuse array circuit 300 to operate with optimal setting values, a stable operation of the e-fuse array circuit 300 may not be guaranteed.

SUMMARY

Various embodiments of the present invention are directed to a technology for operating a nonvolatile memory circuit (e.g., e-fuse array circuit), which is suitable for storing information required for operation of a semiconductor device in a state where the nonvolatile memory circuit has optimal setting values.

In an embodiment of the present invention, a semiconductor device may include: one or more internal circuits; a nonvolatile memory circuit including a first region suitable for storing first data for the nonvolatile memory circuit and a second region suitable for storing second data for the internal circuits; a first register suitable for temporarily storing the first data; one or more second registers suitable for temporarily storing the second data; and a control circuit suitable for controlling the nonvolatile memory circuit to transmit the first data and the second data to the first register and the second registers respectively, when a boot-up operation is performed.

When the boot-up operation is performed, a first boot-up operation from the first region to the first register is performed before a second boot-up operation from the second region to the second registers.

The first boot-up operation is performed at lower speed than the second boot-up operation. Furthermore, a first read voltage used for a read operation for the first region included in the nonvolatile memory circuit has a higher voltage level than that of a second read voltage used for a read operation for the second region included in the nonvolatile memory circuit.

In an embodiment of the present invention, a semiconductor device may include: one or more internal circuits; a nonvolatile memory circuit including a first region suitable for storing first data for operation of the nonvolatile memory circuit, a second region suitable for storing the same data as the first data, and a third region suitable for storing second data for the internal circuits; a first register suitable for temporarily storing the first data; one or more second registers suitable for temporarily storing the second data; and a control circuit suitable for controlling the nonvolatile memory circuit to transmit the first data and the second data to the first register and the second registers, respectively, when a boot-up operation is performed, A first read operation is performed on the first and second regions at the same time, and data read from the first region and data read from the second region are used to generate read data corresponding to the first data.

When one or more of the read data of the first region and the read data of the second region are program data, the read data of the first region are generated as program data, and when the read data of the first region and the read data of the second region are non-program data, the read data of the first region are generated as non-program data.

In an embodiment of the present invention, a method of operating a semiconductor device with a nonvolatile memory circuit, may include: activating a boot-up signal; performing a first boot-up operation on a first nonvolatile memory region included in the nonvolatile memory circuit based on the boot-up signal; optimizing the nonvolatile memory circuit based on data obtained by the first boot-up operation; and performing a second boot-up operation on a second nonvolatile memory region based on the boot-up signal after the nonvolatile memory circuit is optimized.

DETAILED DESCRIPTION

Figure 1:
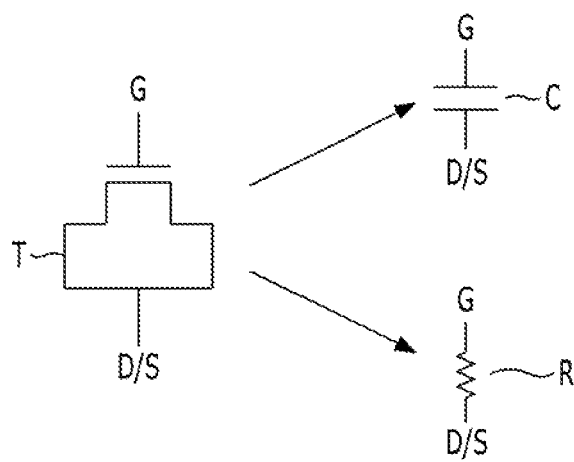
FIG. 1 is a diagram illustrating an e-fuse implemented with a transistor that operates as a resistor or capacitor.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is also noted that in this specification, "connected/coupled" refers to one component not only directly coupling another component but also indirectly coupling another component through an intermediate component. In addition, a singular form may include a plural form as long as it is not specifically mentioned in a sentence. It should be readily understood that the meaning of "on" and "over" in the present disclosure should be interpreted in the broadest manner such that "on" means not only "directly on" but also "on" something with an intermediate feature(s) or a layer(s) therebetween, and that "over" means not only directly on top but also on top of something with an intermediate feature(s) or a layer(s) therebetween. When a first layer is referred to as being "on" a second layer or "on" a substrate, it not only refers to a case where the first layer is formed directly on the second layer or the substrate but also a case where a third layer exists between the first layer and the second layer or the substrate.

Figure 5:
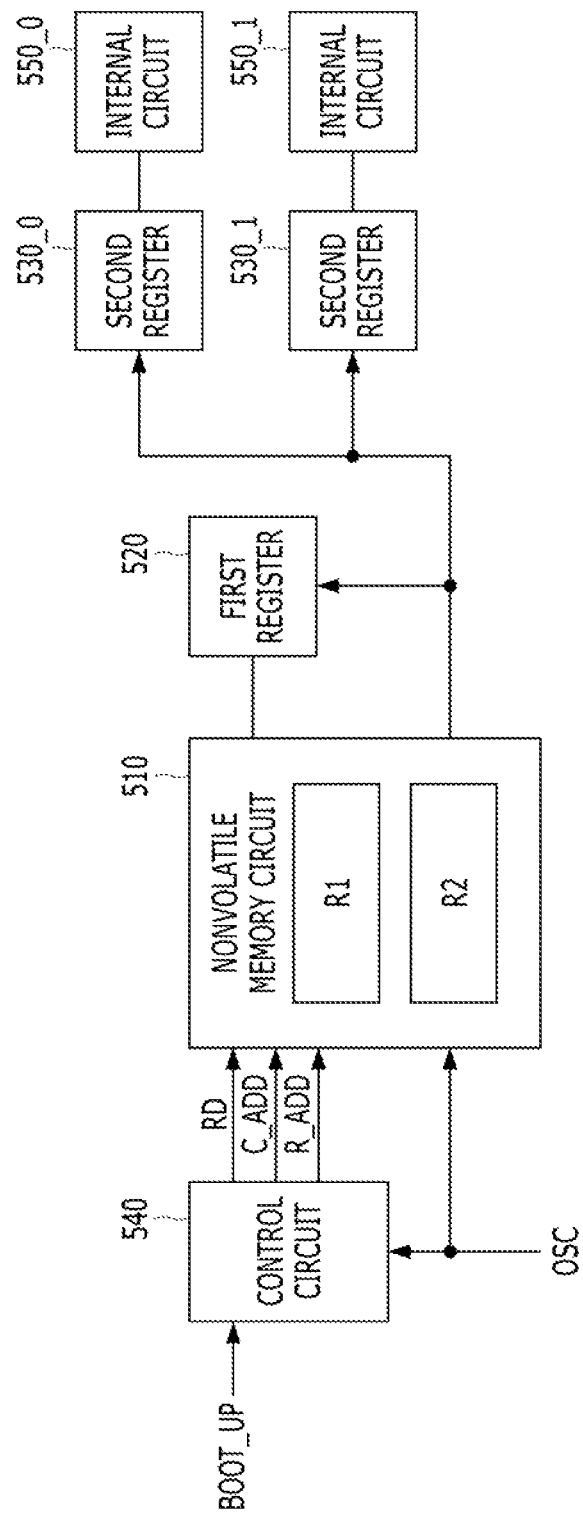
FIG. 5 is a block diagram illustrating a semiconductor device in accordance with an embodiment of the present invention.

FIG. 5 is a block diagram illustrating a semiconductor device in accordance with an embodiment of the present invention.

Referring to FIG. 5, the semiconductor device may include a nonvolatile memory circuit 510, a first register 520, second registers 530_0 and 530_1, a control circuit 540, and internal circuits 550_0 and 550_1.

Figure 2:
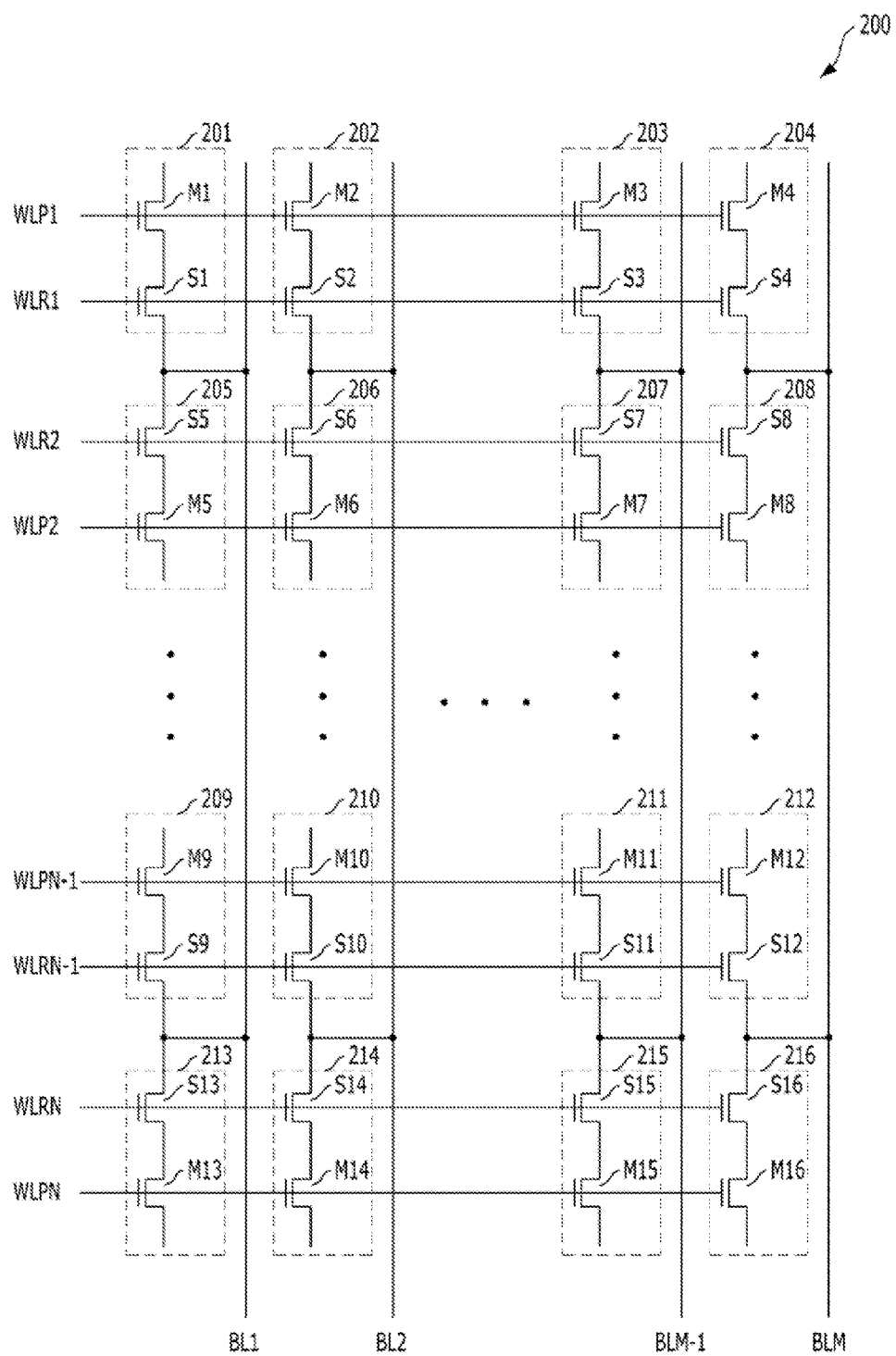
FIG. 2 is a diagram illustrating a conventional cell array implemented with e-fuses.
Figure 3:
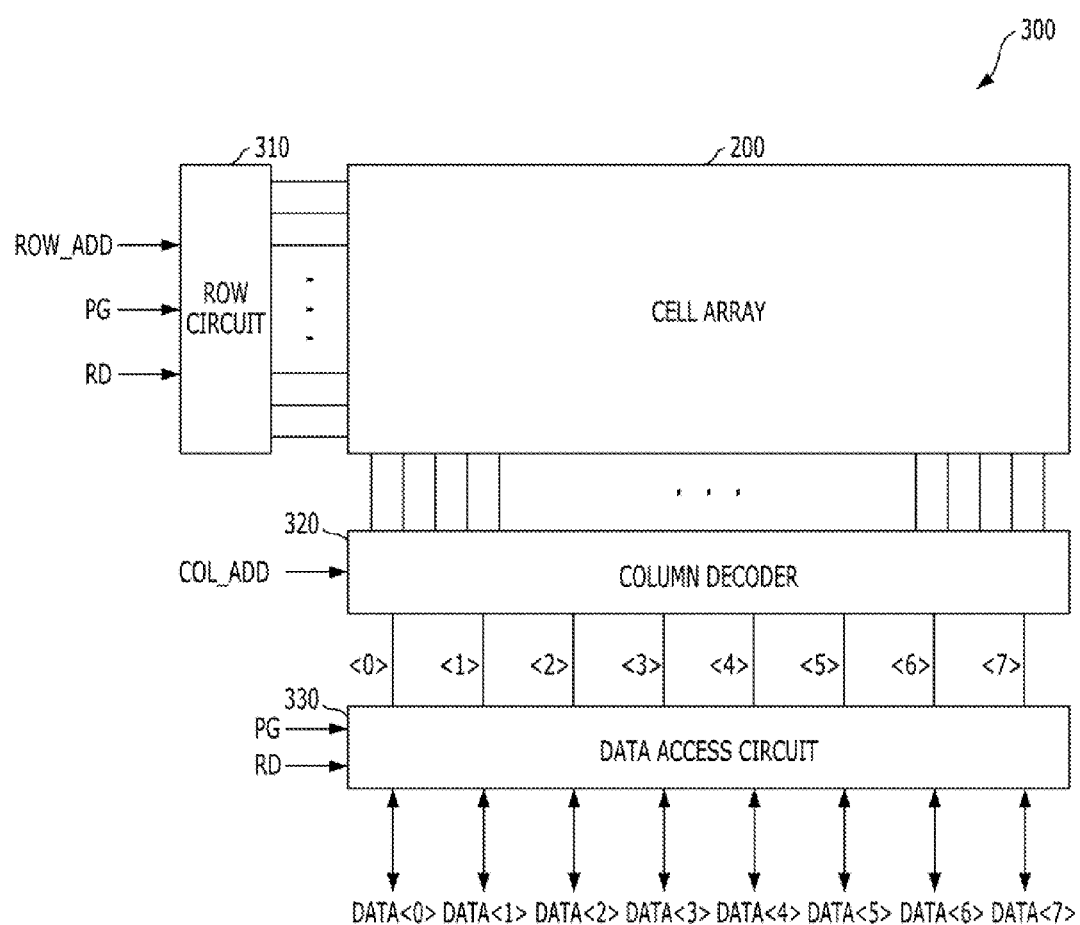
FIG. 3 is a block diagram illustrating an e-fuse array circuit including the cell array shown in FIG. 2.
Figure 4:
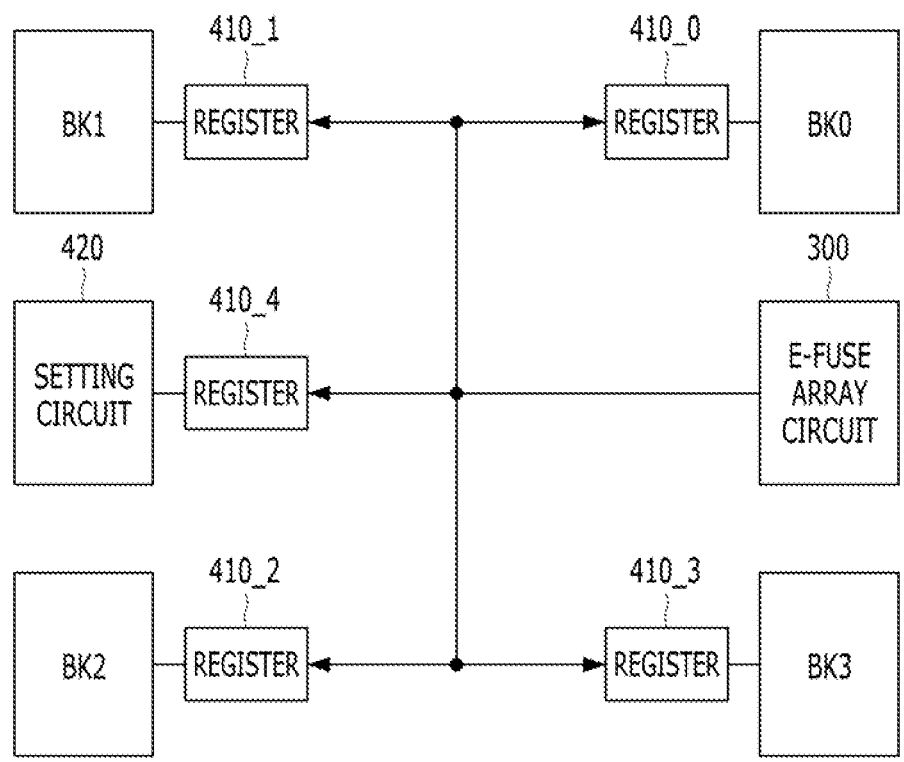
FIG. 4 is a diagram illustrating a conventional memory device including the e-fuse array circuit shown in FIG. 3.

The nonvolatile memory circuit 510 may store data required for operation of the semiconductor device. The nonvolatile memory circuit 510 may include the e-fuse array circuit illustrated in FIGS. 2 and 3, but is not limited thereto. The nonvolatile memory device 510 may be implemented with one of various types of nonvolatile memory circuits such as an e-fuse array circuit, a NAND flash memory, a NOR flash memory, an erasable programmable read only memory (EPROM), an electrically erasable programmable read only memory (EEPROM), a ferroelectric RAM (FRAM), and a magnetoresistive RAM (MRAM). The nonvolatile memory circuit 510 may include a cell array divided into first and second regions R1 and R2. The first region R1 may store data required for operation of the nonvolatile memory circuit 510, and the second region R2 may store data required for operations of the internal circuits 550_0 to 550_1.

The control circuit 540 may control a boot-up operation of the nonvolatile memory circuit 510. When a boot-up signal BOOT_UP is activated, the control circuit 540 may periodically activate a read signal RD such that the nonvolatile memory circuit 510 performs a read operation. Furthermore, whenever a read operation is performed, the control circuit 540 may change and apply a row address R_ADD and a column address C_ADD such that different data are read from the nonvolatile memory circuit 510. Whenever a read operation is performed, one or more of the row address R_ADD and the column address C_ADD may be changed. An oscillation signal OSC may indicate a signal for a synchronized operation of the control circuit 540. For example, during a boot-up operation, the control circuit 540 may activate the read signal RD and change the addresses R_ADD and C_ADD whenever the oscillation signal OSC is activated five times. The oscillation signal OSC may be supplied to the nonvolatile memory circuit 510, and used for determining the operation timing of the nonvolatile memory circuit 510. During the boot-up operation, the control circuit 540 may control the nonvolatile memory circuit 510 such that the data of the first region R1 are first read and then the data of the second region R2 are read after all of the data of the first region R1 are read.

The first register 520 may receive the data read from the first region R1 of the nonvolatile memory circuit 510 and store the received data, during the boot-up operation. The data stored in the first register 520 through the boot-up operation may be used for setting (or trimming) of the nonvolatile memory circuit 510. The setting (or trimming) may include optimizing various voltage levels used in the nonvolatile memory circuit 510, setting the resistance values of the internal elements of the nonvolatile memory circuit 510, and setting operation timings of the internal circuits of the nonvolatile memory circuit 510. That is, though the data of the first register 520 are data transmitted from the first region R1 of the nonvolatile memory circuit 510, the data of the first register 520 may be used for an optimized operation of the nonvolatile memory circuit 510.

The second registers 530_0 and 530_1 may receive data read from the second region R2 of the nonvolatile memory circuit 510 and store the received data, during the boot-up operation. The data stored in the second register 530_0 through the boot-up operation may be used for the operation of the internal circuit 550_0, and the data stored in the second register 530_1 through the boot-up operation may be used for the operation of the internal circuit 550_1.

The internal circuits 550_0 to 550_1 may include circuits that may use the data stored in the nonvolatile memory circuit 510. For example, when the semiconductor device is a memory device, the internal circuit 550_0 may be a memory bank, and may perform a repair operation using the data stored in the second register 530_0. Furthermore, the internal circuit 550_1 may be a setting circuit, and may perform various setting operations using the data stored in the second register 530_1.

Figure 6:
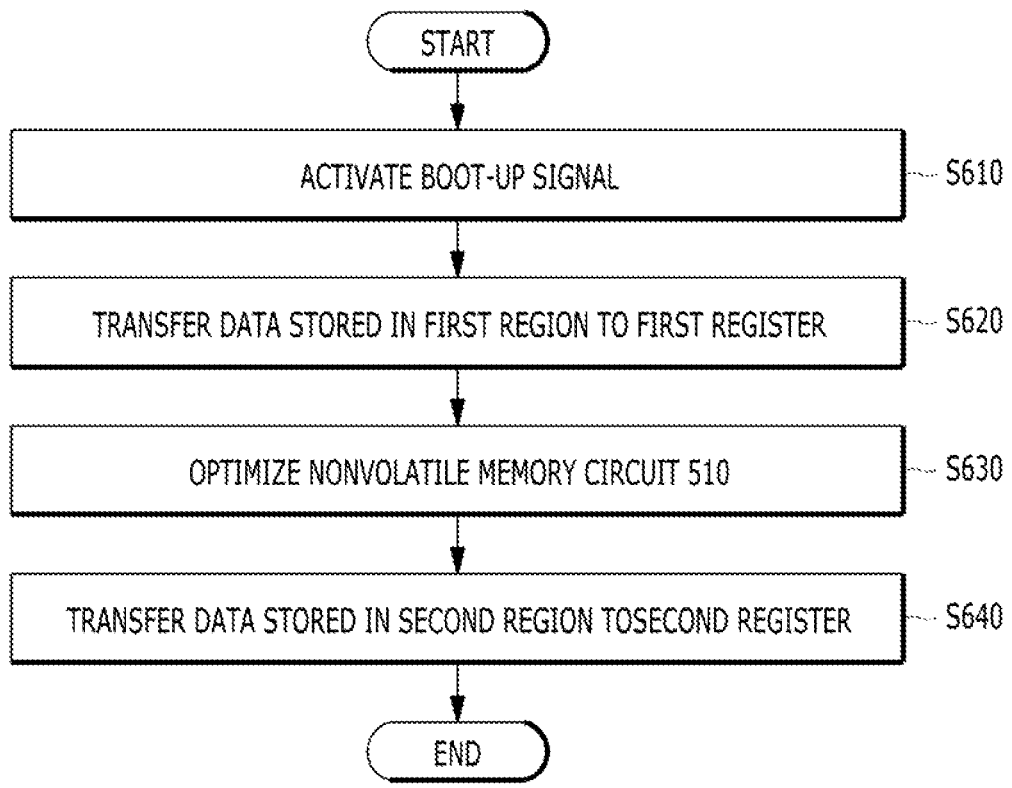
FIG. 6 is a flow chart for describing an operation of the semiconductor device shown in FIG. 5.

FIG. 6 is a flow chart for describing an operation of the semiconductor device shown in FIG. 5.

Referring to FIGS. 5 and 6, the boot-up signal BOOT_UP may be activated at step S610. The boot-up signal BOOT_UP may be activated when a predetermined time elapses after power-up of the semiconductor device. That is the boot-up signal BOOT_UP may be activated during the initial operation of the semiconductor device.

The boot-up operation may be started when the boot-up signal BOOT_UP is activated. First, data stored in the first region R1 of the nonvolatile memory circuit 510 may be transferred to the first register 520 at step S620. The control circuit 540 may periodically activate the read signal RD applied to the nonvolatile memory circuit 510. Whenever the read signal RD is activated, the control circuit 540 may change the address R_ADD and C_ADD to read data from the nonvolatile memory circuit 510. The data FUSE_DATA read from the nonvolatile memory circuit 510 may be transmitted and stored into the first register 510.

When the boot-up operation from the first region R to the first register 520 is completed, the nonvolatile memory circuit 510 may be optimized by the data stored in the first register 520 at step S630. The optimization of the nonvolatile memory circuit 510 may indicate that operation timings, resistance values, and the levels of various voltages used in the nonvolatile memory circuit 510 are set to optimal values. The nonvolatile memory circuit 510 may be more stably operated after the nonvolatile memory circuit 510 is optimized.

The data of the second region R of the nonvolatile memory circuit 510 may be transferred into the second registers 530_0 to 530_1 at step S640. The boot-up operation of S640 and the boot-up operation of S620 (i.e., a first boot-up operation) may be performed in the same manner. However, the boot-up operation of S640 (i.e., a second boot-up operation) and the boot-up operation of S620 are different from each other in that regions from which data are read in the nonvolatile memory circuit 510 are different and the data are stored in different registers. Since the boot-up operation of S640 is performed after the nonvolatile memory circuit 510 is set to the optimal values, the boot-up operation of S640 may be performed with higher stability than the boot-up operation of S620.

In the semiconductor device descried in FIGS. 5 and 6, the data for the operation of the nonvolatile memory circuit 510 may be stored in the first region R1 of the nonvolatile memory circuit 510, and the boot-up operation of S620 from the first region R1 to the first register 520 may be preferentially performed. Thus, the nonvolatile memory circuit 510 may be operated after the nonvolatile memory circuit 510 is set to the optimal values. However, since the boot-up operation of S620 is performed in a state where the nonvolatile memory circuit 510 is not set to the optimal values, the boot-up operation may not be stably performed. Hereafter, embodiments for stably performing the boot-up operation of S620 will be described.

Figure 7:
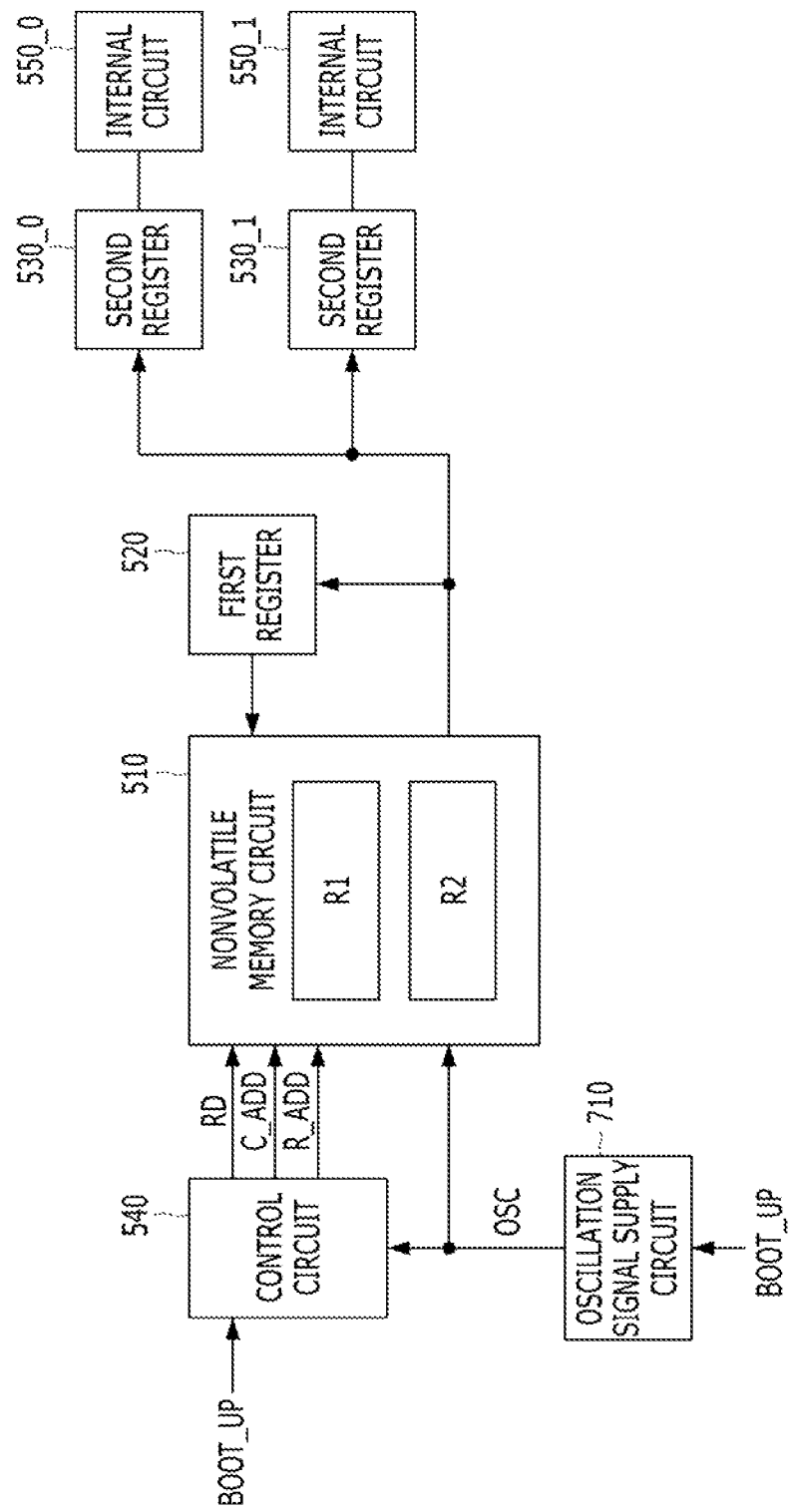
FIG. 7 is a block diagram illustrating a semiconductor device n accordance with an embodiment of the present invention.

FIG. 7 is a block diagram illustrating a semiconductor device in accordance with an embodiment of the present invention. FIG. 7 illustrates an embodiment in which the speed of the boot-up operation of S620 and the speed of the boot-up operation of S640 are controlled differently to increase the stability of the boot-up operation of S620.

Referring to FIG. 7, the semiconductor device may further include an oscillation signal supply circuit 710 for generating an oscillation signal OSC. The oscillation signal supply circuit 710 may periodically activate the oscillation signal OSC in response to the boot-up signal BOOT_UP. During a period in which the boot-up operation of S620 from the first region R1 of the nonvolatile memory circuit 510 to the first register 520 is performed, the oscillation signal supply circuit 710 may generate the oscillation signal OSC having a low frequency. During a period in which the boot-up operation of S640 from the second region R2 of the nonvolatile memory circuit 510 to the second registers 530_0 and S301 is performed, the oscillation signal supply circuit 710 may generate the oscillation signal OSC having a high frequency. For example, when 20 cycles are required for completing the boot-up operation of S620 and 1,000 cycles are required for completing the boot-up operation of S640 the oscillation signal supply circuit 710 may generate the oscillation signal OSC having a frequency of 100 Mhz while the oscillation signal OSC is activated 20 times after the boot-up signal BOOT_UP is activated, and then generate the oscillation signal OSC having a frequency of 400 Mhz while the oscillation signal OSC is activated 1,000 times. Hereafter, suppose that 20 cycles are required for the boot-up operation of S620 and 1,000 cycles are required for the boot-up operation of S640.

Since the operations of the control circuit 540 and the nonvolatile memory circuit 510 are performed in synchronization with the oscillation signal OSC, the boot-up operation of S620 may be performed at low speed, and the boot-up operation of S640 may be performed at high speed. When the boot-up operation of S620 is performed, the operation may be destabilized because the nonvolatile memory circuit 510 is not set to the optimal values. However, since the boot-up operation of S620 is performed at low speed, the nonvolatile memory circuit 510 may be stably operated even though the nonvolatile memory circuit 510 is not set to the optimal values.

For reference, the semiconductor device of FIG. 5 may also require a circuit for generating an oscillation signal OSC. However, any circuits may be applied as the circuit for generating an oscillation signal OSC as long as they may generate an oscillation signal having a constant frequency. Furthermore, as illustrated in FIG. 7, the semiconductor device of FIG. 5 may not require the oscillation signal supply circuit 710 for generating an oscillation signal OSC at a different frequency during each of the boot-up operations S620 and S640.

Figure 8:
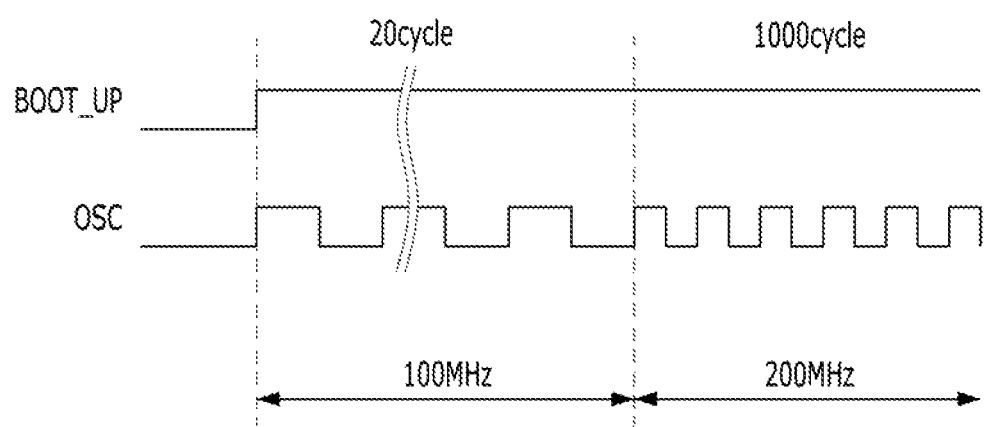
FIG. 8 is a timing diagram for describing an oscillation signal generated from an oscillation signal supply circuit shown in FIG. 7.

FIG. 8 is a timing diagram for describing the oscillation signal OSC generated from the oscillation signal supply circuit 710 shown in FIG. 7.

Referring to FIG. 8, the oscillation signal OSC may be activated when the boot-up signal BOOT_UP is activated. During the initial period of the boot-up operation, that is, during 20 cycles in which the boot-up operation of S620 is performed, an oscillation signal may be generated at a frequency of 100 MHz. Then, during 1,000 cycles in which the boot-up operation of S640 is performed, an oscillation signal may be generated at a frequency of 200 MHz.

When the boot-up operation of S620 is performed, the nonvolatile memory circuit 510 may be operated in a state where the nonvolatile memory circuit 510 is not optimized. However, since the boot-up operation is performed at low speed, the nonvolatile memory circuit 510 may be stably operated. Furthermore, when the boot-up operation of S640 is performed, the nonvolatile memory circuit 510 may be operated in a state where the nonvolatile memory circuit 510 is optimized. Thus, the nonvolatile memory circuit 510 may be stably operated at high speed.

Figure 9:
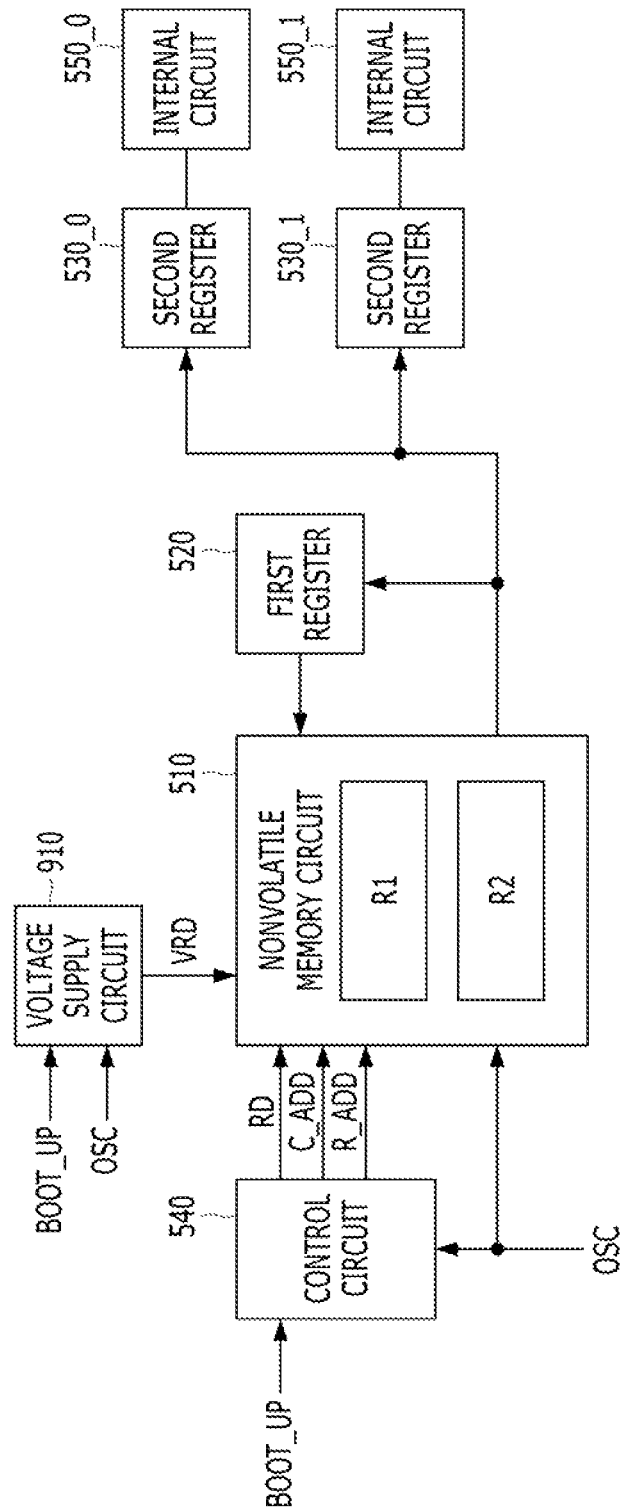
FIG. 9 is a block diagram illustrating a semiconductor device in accordance with an embodiment of the present invention.

FIG. 9 is a block diagram illustrating a semiconductor device in accordance with an embodiment of the present invention. FIG. 9 illustrates an embodiment in which the level of a voltage used in the boot-up operation of S620 and the level of a voltage used in the boot-up operation of S640 are set differently to increase the stability of the boot-up operation.

Referring to FIG. 9, the semiconductor device may further include a voltage supply circuit 910 that may generate a read voltage VRD used in the nonvolatile memory circuit 510. The read voltage VRD may indicate a voltage used for a read operation of the nonvolatile memory circuit. The voltage supply circuit 910 may generate the read voltage VRD having a higher level during a period in which the boot-up operation of S620 from the first region R1 of the nonvolatile memory circuit 510 to the first register 520 is performed, and generate the read voltage VRD having a normal level during a period in which the boot-up operation of S640 from the second region R2 of the nonvolatile memory circuit 510 to the second registers 530_0 and 530_1 is performed. For example, when the normal level of the read voltage VRD is 2V, the voltage supply circuit 910 may generate the read voltage VRD having 3V in the period where the hoot-up operation of S620 is performed, and generate the read voltage VRD having 2V in the period where the boot-up operation of S640 is performed.

The voltage supply circuit 910 may distinguish between the period of the boot-up operation of S620 and the period of the boot-up operation of S640, using the oscillation signal OSC. For example, until the oscillation signal OSC is activated 20 times, the voltage supply circuit 910 may recognize the corresponding period as the period in which the boot-up operation of S620 is performed, and generate the read voltage VRD having 3V. Then, the voltage supply circuit 910 may generate the read voltage VRD having 2V.

Most circuits may be more stably operated as a high operating voltage is used (as long as the operating voltage is not excessively high). During the boot-up operation of S620 the nonvolatile memory circuit 510 may be operated in a state where the nonvolatile memory circuit 510 is not optimized. However since the nonvolatile memory circuit 510 performs a read operation using the read voltage VRD having a relatively high level, the nonvolatile memory circuit 510 may be stably operated.

For reference, the semiconductor device of FIG. 5 may also require a circuit for generating a read voltage VRD. However, any circuits may be applied as the circuit for generating a read voltage VRD, as long as they may generate a read voltage VRD having a constant level. Furthermore, the semiconductor device of FIG. 5 may not require the circuit 910 for generating a read voltage VRD having a different level during each of the boot-up operations S620 and S640 as illustrated in FIG. 9. Furthermore, FIG. 9 illustrates that the read voltage VRD is generated at a different level during each of the boot-up operations S620 and S640. However, other voltages excluding the read voltage VRD used in the nonvolatile memory circuit 510 may be generated at a different level during each of the boot-up operations S620 and S640.

Figure 10:
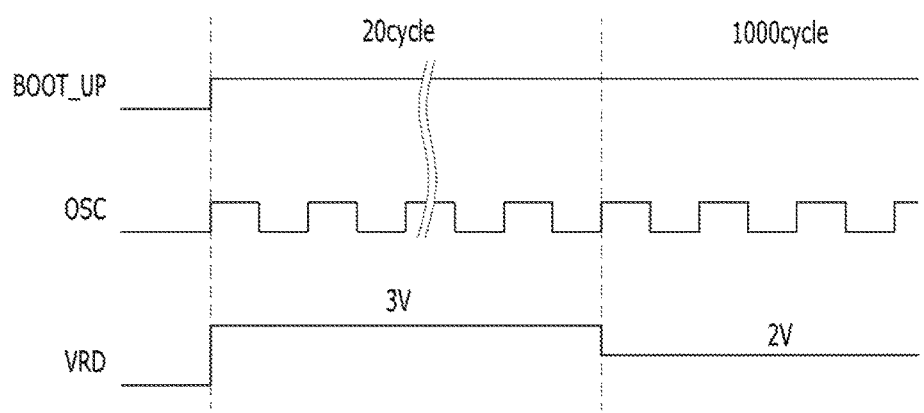
FIG. 10 is a timing diagram for describing a read voltage generated from a voltage supply circuit shown in FIG. 9.

FIG. 10 is a timing diagram for describing the read voltage VRD generated from the voltage supply circuit 910 shown in FIG. 9.

Referring to FIG. 10, the read voltage VRD may be generated at 3V during the period in which the boot-up operation of S620 is performed, that is, until the oscillation signal OSC is activated 20 times. Then, the read voltage VRD may be generated at 2V.

Figure 11:
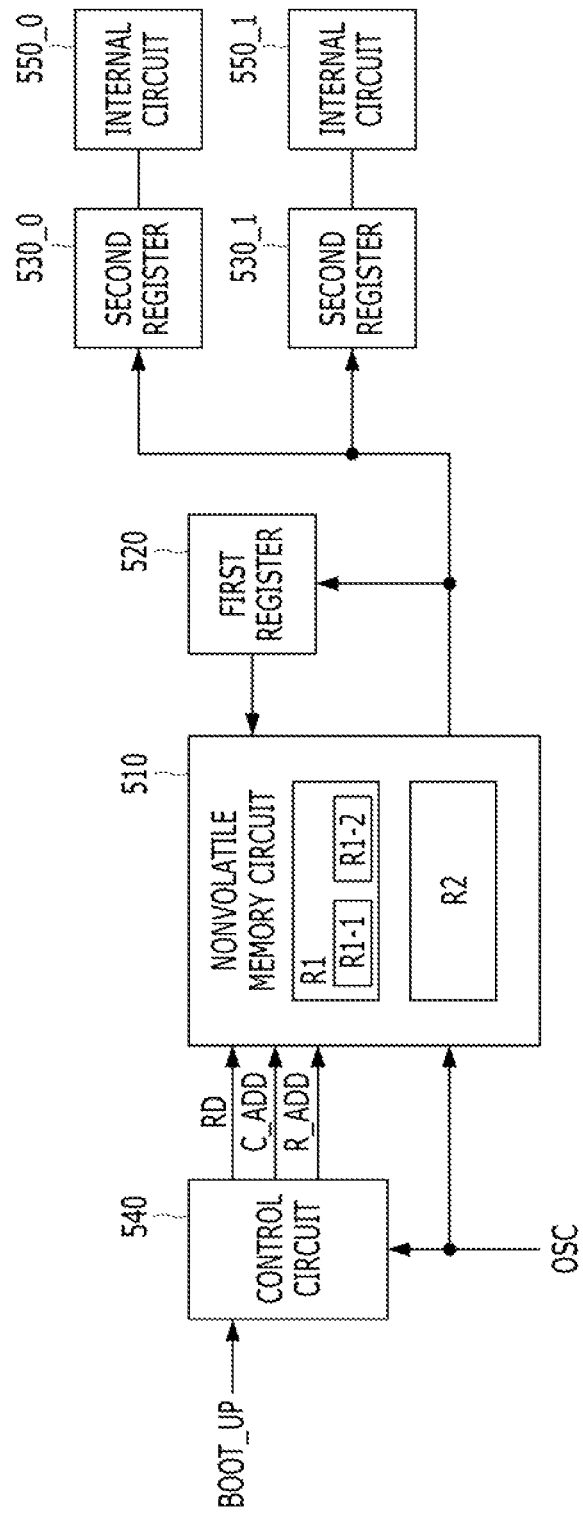
FIG. 11 is a block diagram illustrating a semiconductor device in accordance with an embodiment of the present invention.

FIG. 11 is a block diagram illustrating a semiconductor device in accordance with an embodiment of the present invention. FIG. 11 illustrates an embodiment in which data to be read from the nonvolatile memory circuit 510 during the boot-up operation of S620 are redundantly stored, and during the boot-up operation of S620, the redundantly stored data are simultaneously read to increase the stability of the boot-up operation.

Referring to FIG. 11, the first region R1 of the nonvolatile memory circuit 510 may be divided into a first-first region R1-1 and a first-second region R1-2. The first region R1 may indicate a region of which data are to be transmitted to the first register 520. The data stored (or programmed) in the first-first region R1-1 and the first-second region R1-2 are equal to each other. During the boot-up operation of S620 from the first-first region R1-1 and the first-second region R1-2 to the first register 520, the data may be simultaneously read from the two regions R1-1 and R1-2 to generate data to be transmitted to the first register 520.

The data, which are read from the nonvolatile memory circuit 510 and transmitted to the first register 520 during the boot-up operation of S620, may be redundantly stored in the first-first region R1-1 and the first-second region R1-2, and the redundantly stored data may be simultaneously read to increase the stability of the boot-up operation of S620.

Figure 12:
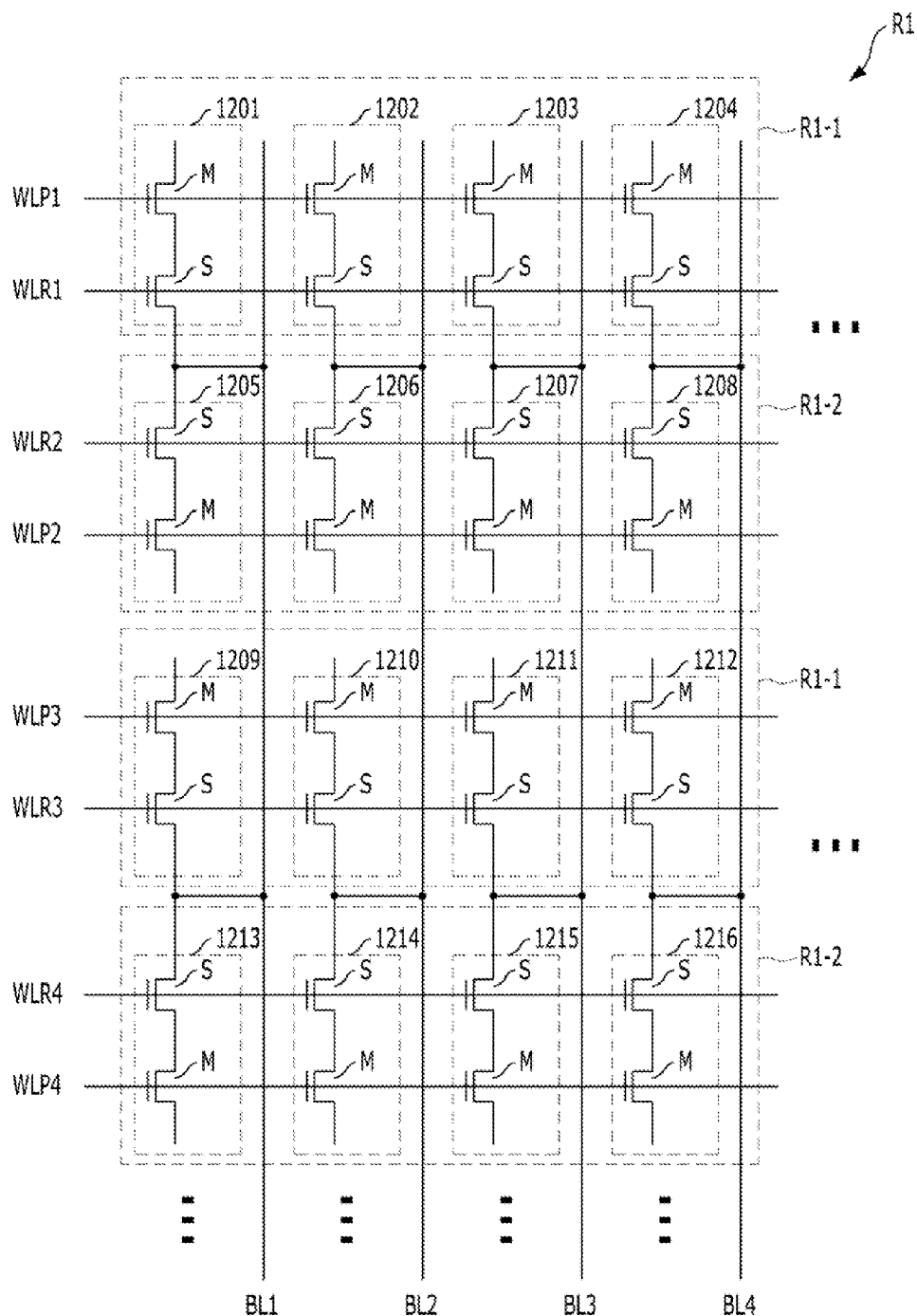
FIG. 12 is a detailed diagram of a first region included in a nonvolatile memory circuit shown in FIG. 11.

FIG. 12 is a detailed diagram of the first region R1 included in the nonvolatile memory circuit 510 shown in FIG. 11. As described above, data may be redundantly stored in the first-first region R1-1 and the first-second region R1-2, and simultaneously read to increase the stability of the read operation for the first region R1. Hereafter, the reasoning will be described.

Referring to FIG. 12, odd rows in the first region R1 may be classified as the first-first region R1-1, and even rows may be classified as the first-second region R1-2. In the first-first region R1-1 and the first-second region R1-2, the same data may be redundantly stored in above and below adjacent memory cells. For example, the same data may be stored in a memory cell 1202 and a memory cell 1206, and the same data may be stored in a memory cell 1212 and a memory cell 1216. Furthermore, a read operation for the first-first region R1-1 and a read operation for the first-second region R1-2 may be performed at the same time. For example, a read operation for the memory cell 1201 may be performed at the same time as a read operation for the memory cell 1205, and a read operation for the memory cell 1203 may be performed at the same time as a read operation for the memory cell 1207.

When the read operations for the memory cells of the first-first region R1-1 and the first-second region R1-2, in which the same data are stored, are performed at the same time, the stability of the read operations may be increased. The reasoning will be described as follows. For example, suppose that read operations for the memory cell 1202 and the memory cell 1206 are performed when program data are stored in the two memory cells 1202 and 1206. In this case, row lines WLR1 and WLR2 may be activated to turn on the switch element S of the memory cells 1202 and 1206, and the read voltage VRD may be applied to program/read lines WLP1 and WLP2 such that current flows into the bit line BL1 through the memory elements M of the memory cells 1202 and 1206. Then, by checking whether current flows through the bit line BL1, it may be possible to check whether data stored in the memory cells 1202 and 1206 are program data. When program data is stored in the memory cell 1202 but a read operation is incompletely performed, no current flows into the bit line BL1 through the memory element M of the memory cell 1202. In this case, however, since current flows into the bit line BL1 through the memory element M of the memory cell 1206, the program data may be read. That is, when current may flow into the bit line BL1 through the memory element M of one or more of the memory cells 1202 and 1206, the data of the memory cells 1202 and 1206 may be correctly recognized as program data.

In other words, when program data may be read from one or more of the memory cells 1202 and 1206, the data of the memory cells 1202 and 1206 may be recognized as program data. Furthermore, when non-program data are read from both of the memory cells 1202 and 1206, that is, when no current flows through the first bit line BL1, the data of the memory cells 1202 and 1206 may be recognized as non-program data. An error in which program data are read as non-program data in the nonvolatile memory circuit 510 may occur at a higher frequency than an error in which non-program data are read as program data. Thus, when program data are read only from one or more of two memory cells 1202 and 1206 after the same data is programmed into the two memory cells 1202 and 1206, the method for recognizing data as program data may significantly contribute to reducing errors.

FIG. 12 illustrates that odd rows and even rows of the first region R1 are classified as the first-first region R1-1 and the first-second region R1-2, respectively. However, the following method may be also applied. The odd columns and even columns of the first region R1 may be classified as the first-first region R1-1 and the first-second region R1-2, respectively, and the same data may be programmed into the first-first region R1-1 and the first-second region R1-2. Then, when the first-first region R1-1 and the first-second region R1-2 are read at the same time and program data are read from one or more of the two regions, the data may be recognized as program data.

FIGS. 7 and 8 illustrate the method for securing the stability of the boot-up operation of S620 by controlling the speed of the boot-up operation of S620 differently from the boot-up operation of S640 (referred to as a first method). FIGS. 9 and 10 illustrate the method for securing the stability of the boot-up operation of S620 by differently setting the levels of the voltages used during the boot-up operation of S620 and the boot-up operation of S640 (referred to as a second method). FIGS. 11 and 12 illustrate the method for securing the stability of the boot-up operation of S620 by simultaneously reading data which are redundantly stored in the first-first region R1-1 and the first-second region R1-2 of the first region R1 (referred to as a third method). The first to third methods may not be independently used, but simultaneously used. That is, the use of the first method may not exclude the use of the second and third methods (2) and (3), but two or more of the first to third methods may be applied at the same time.

In accordance with the embodiments of the present invention, the nonvolatile memory circuit storing various pieces of information for operation of internal circuits of the semiconductor device may be operated with optimal setting information.

In particular, even during a period in which the nonvolatile memory circuit does not yet have optimal setting information, the nonvolatile memory circuit may be stably operated.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
   one or more internal circuits;
   a nonvolatile memory circuit having a first region suitable for storing first data for operation of the nonvolatile memory circuit itself and a second region suitable for storing second data for the internal circuits;
   a first register suitable for temporarily storing the first data transferred from the nonvolatile memory and being used to optimize the nonvolatile memory;
   one or more second registers suitable for temporarily storing the second data transferred from the nonvolatile memory and being used for an operation of the one or more internal circuits; and
   a control circuit suitable for controlling the nonvolatile memory circuit to transmit the first data to the first register and controlling the nonvolatile memory circuit to transmit the second data to the second register after the first data is transferred to the first register and the nonvolatile memory circuit is optimized, when a boot up operation is performed.

2. The semiconductor device of claim 1, wherein a first boot-up operation from the first region to the first register is performed at lower speed than a second boot-up operation from the second region to the second register.

3. The semiconductor device of claim 2, further comprising an oscillation signal supply circuit suitable for supplying an oscillation signal to the nonvolatile memory circuit and the control circuit for a synchronized operation thereof,
   wherein, when the first boot-up operation is performed, the oscillation signal has a lower frequency than when the second boot-up operation is performed.

4. The semiconductor device of claim 1, wherein a first read voltage used for a read operation for the first region included in the nonvolatile memory circuit has a higher voltage level than that of a second read voltage used for a read operation for the second region included in the nonvolatile memory circuit.

5. The semiconductor device of claim 4, further comprising a voltage supply circuit suitable for supplying the first and second read voltage to the nonvolatile memory circuit.

6. The semiconductor device of claim 1, wherein the internal circuits comprise a memory bank, and
the second data include repair information for the memory bank.

7. The semiconductor device of claim 6, wherein the internal circuits further comprise a setting circuit, and
the second data further include setting information for the setting circuit.

8. The semiconductor device of claim 1, wherein the nonvolatile memory circuit comprises an e-fuse array circuit.

9. A semiconductor device comprising:
one or more internal circuits;
a nonvolatile memory circuit having a first region suitable for storing first data for operation of the nonvolatile memory circuit itself, a second region suitable for storing the same data as the first data, and a third region suitable for storing second data for the internal circuits;
a first register suitable for temporarily storing the first data transferred from the nonvolatile memory and being used to optimize the nonvolatile memory;
one or more second registers suitable for temporarily storing the second data transferred from the nonvolatile memory and being used for an operation of the one or more internal circuits; and
a control circuit suitable for controlling the nonvolatile memory circuit to transmit the first data to the first register and controlling the nonvolatile memory circuit to transmit the second data to the second register after the first data is transferred to the first register and the nonvolatile memory circuit is optimized, when a boot up operation is performed,
wherein, a first read operation is performed on the first and second regions at the same time, and data read from the first region and data read from the second region are used to generate read data corresponding to the first data.

10. The semiconductor device of claim 9, wherein, when one or more of the read data of the first region and the read data of the second region are program data, the read data corresponding to the first data is generated as the program data, and when the read data of the first region and the read data of the second region are non-program data, the read data corresponding to the first data is generated as the non-program data.

11. The semiconductor device of claim 9, wherein a first boot-up operation from the first and second regions to the first register is performed at lower speed than a second boot-up operation from the third region to the second registers.

12. The semiconductor device of claim 9, wherein a first read voltage used for read operations for the first and second regions included in the nonvolatile memory circuit is higher than a second read voltage used for a read operation for the second region included in the nonvolatile memory circuit.

13. The semiconductor device of claim 9, wherein the internal circuits comprise a memory bank, and
the second data include repair information for the memory bank.

14. The semiconductor device of claim 13, wherein the internal circuits further comprise a setting circuit, and
the second data further include setting information for the setting circuit.

15. The semiconductor device of claim 10, wherein the nonvolatile memory circuit comprises an e-fuse array circuit.

* * * * *